United States Patent [19]

Hinn

[11] 4,400,720
[45] Aug. 23, 1983

[54] DYNAMIC DE-EMPHASIS COMPENSATION SYSTEM

[75] Inventor: Werner Hinn, Zollikerberg, Switzerland

[73] Assignee: RCA Corporation, New York, N.Y.

[21] Appl. No.: 271,034

[22] Filed: Jun. 4, 1981

[30] Foreign Application Priority Data

May 7, 1981 [GB] United Kingdom ............... 8114021

[51] Int. Cl.³ ........................................... H04N 9/38
[52] U.S. Cl. ..................................... 358/25; 358/11; 358/19
[58] Field of Search ....................... 358/11, 14, 18, 19, 358/23, 24, 25, 40

[56] References Cited

U.S. PATENT DOCUMENTS

| 4,232,268 | 11/1980 | Hinn | 358/23 |
| 4,233,622 | 11/1980 | Groeneweg | 358/11 |
| 4,263,608 | 4/1981 | Hinn | 358/11 |

FOREIGN PATENT DOCUMENTS

| 1062734 | 8/1959 | Fed. Rep. of Germany | |
| 1358551 | 7/1974 | United Kingdom | 358/11 |

Primary Examiner—Tommy P. Chin
Attorney, Agent, or Firm—Eugene M. Whitacre; Paul J. Rasmussen; William H. Meagher

[57] ABSTRACT

In color TV receiver for SECAM-encoded signals, a single FM detector, subject to line-by-line switching of its center frequency tuning, achieves sequential demodulation of respective SECAM subcarriers. For the purpose of using an identification system of the type shown in U.S. Pat. No. 4,240,102, center frequency tuning at the R-Y subcarrier resting frequency is held throughout R-Y line interval and during lead-in burst of B-Y line interval, terminating at beginning of image portion of B-Y line interval. Transient signal component, associated with switching to B-Y subcarrier resting frequency at beginning of that image portion, is stretched into early segment of image portion by de-emphasis circuit following FM detector. To reduce adverse effects thereof on coloring of image at left edge, a differentiated version of a pulse having an appropriately directed trailing edge coinciding with transient is delivered to de-emphasis circuit output terminal, with elements of de-emphasis circuit serving as differentiator.

6 Claims, 2 Drawing Figures

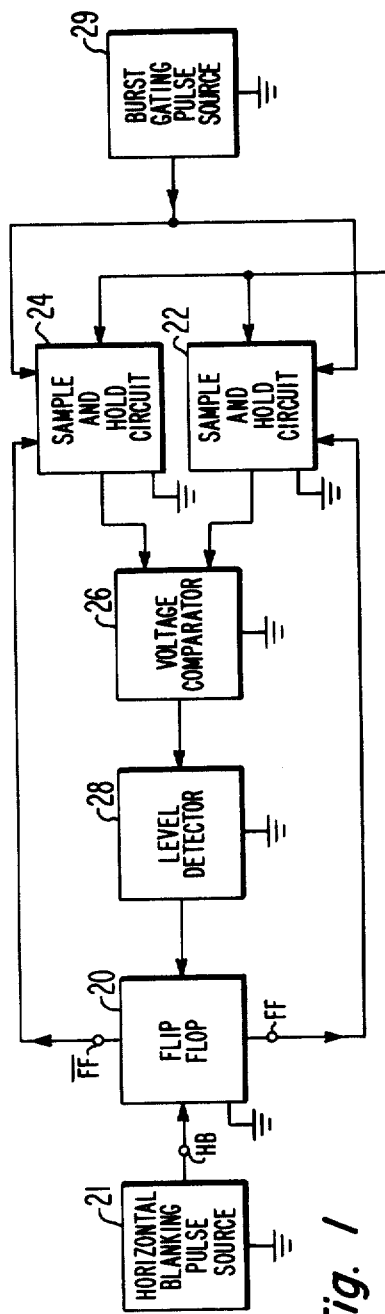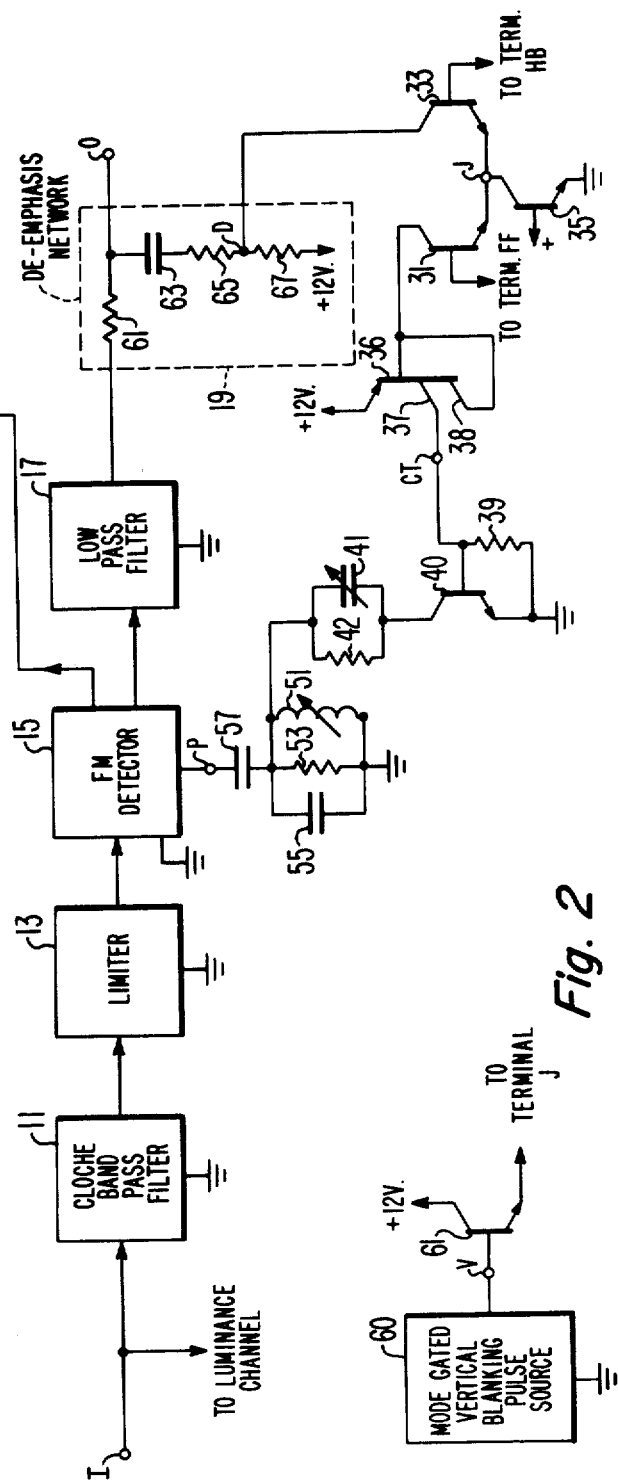

DYNAMIC DE-EMPHASIS COMPENSATION SYSTEM

The present invention relates generally to de-emphasis apparatus for use with an FM demodulator employed to recover color-difference signal information from a color television signal encoded in a SECAM format, and particularly to such de-emphasis apparatus incorporating dynamic compensation for undesired effects therein.

In the SECAM color television system, R-Y and B-Y color-difference signals frequency modulate respective subcarriers (with respective resting frequencies of 4.40625 MHz. and 4.250 MHz.) which are provided alternately on a line-by-line basis in the active line intervals of the transmitted SECAM signal. An economical approach to processing such signals in a SECAM receiver, which is also attractive for use in dual-standard (SECAM/PAL) receivers, is to convert the SECAM signal into a signal similar to a PAL signal (i.e., a "quasi-PAL" signal) for further processing by standard PAL signal decoding techniques. The system for effecting such conversion is desirably of the general type described in U.K. Pat. No. 1,358,551, wherein the respective SECAM subcarriers are demodulated sequentially by a single FM detector, and the resultant color-difference signals amplitude modulate in appropriate sequence respective phases of a subcarrier derived from the PAL crystal oscillator of the PAL decoder apparatus. U.S. Pat. No. 4,232,268, for example, discloses an arrangement for line-by-line switching of the center frequency tuning of an FM detector which readily permits the aforementioned sequential demodulation of the respective SECAM subcarriers by a single FM detector.

In such use of a single FM detector for sequential demodulation of the respective SECAM subcarriers, an identification system is required for identification and correction of an incorrect mode of line-by-line switching of the detector's center frequency tuning. One source of information for such identification purposes is found in the lead-in bursts of oscillations which precede the image portion of each active line interval (with a lead-in burst at the R-Y resting frequency preceding the image portion of an active line interval that conveys R-Y image information, and with a lead-in burst at the B-Y resting frequency preceding the image portion of an active line interval that conveys B-Y image information).

In the identification system disclosed in U.S. Pat. No. 4,240,102—Groeneweg, a flip-flop develops half line rate control waves for use in switching the center frequency tuning of the detector employed for demodulating received SECAM signals. When the phasing of the flip-flop output is correct, the detector is provided with center frequency tuning (4.40625 MHz.) appropriate to demodulation of the R-Y modulated subcarrier during the image portion of an R-Y line interval of the SECAM signal, and tuning (4.250 MHz.) appropriate for demodulation of the B-Y modulated subcarrier during the image portion of a B-Y line interval of the SECAM signal. Through the supplemental association of line rate pulses in the tuning control, however, the timing of the changes in detector center frequency tuning is so controlled that during the lead-in bursts preceding the image portions of both of such R-Y and B-Y line intervals, the detector center frequency tuning is the same (e.g., tuned for a center frequency corresponding to the R-Y subcarrier resting frequency). As a consequence of holding the same (R-Y subcarrier resting frequency) center frequency tuning for all burst intervals, there appears, in the output of the detector, pulses during alternate line interval blanking portions which identify the successive occurrences of a particular (B-Y) line interval.

In the identification system of the aforesaid Groeneweg patent, the output of a detector subject to center frequency tuning control of the above-described type is applied to a pair of sample-and-hold circuits. Using respective half line rate control waves of mutually opposite phase derived from the flip-flop, and common, line rate, burst interval gating pulses, for control of the sampling times of the respective sample-and-hold circuits, one sample-and-hold circuit effects sampling of the detector output during the lead-in burst occurrence of alternate line intervals, while the other sample-and-hold circuit effects a sampling of the detector output during the lead-in burst occurrence of the intervening line intervals. Comparison of the outputs of the two sample-and-hold circuits in a voltage comparator yields an output indicative of the correctness or incorrectness of the phasing of the flip-flop circuit. When the output is indicative of incorrect flip-flop phasing, the flip-flop is shut down, and then allowed to restart, whereupon a new comparison is effected, with such a process repeated until correct flip-flop phasing is achieved.

In use of an identification system of the type described above, one sense of switching of the center frequency tuning (e.g., from R-Y resting frequency to B-Y resting frequency) of the FM detector is effected at the beginning of the image portion of alternate active line intervals (e.g., B-Y line intervals), while center frequency switching of the other sense is effected at the end of the image portion of said alternate active line intervals. Switching of the first sense mentioned above introduces a rapid transient into the output of the detector at the beginning of said alternate image portions, which transient, upon being effectively slowed by the operation of a conventional de-emphasis circuit following the detector, can introduce spurious color effects at the (left) side of the displayed image, if not compensated for.

The presence of a de-emphasis circuit following the color-difference signal recovering detector is desired to complement the effects of a pre-emphasis, which is conventionally employed in SECAM signal formation to increase the amplitude of the higher frequency components of the respective color-difference signals relative to their low frequency components. The effect of the conventional de-emphasis circuit, in the instance of an original signal transistion which has been subject to the effects of pre-emphasis in SECAM signal formation, is to restore it to its original form. The effect of the conventional de-emphasis circuit on the aforementioned switching-associated transient (generated in the SECAM signal receiving apparatus itself, and not pre-emphasized), however, is a slowing down which stretches its effect into a visible portion of the image display.

In accordance with the principles of the present invention, a de-emphasis system is provided for SECAM signal receiving apparatus of the single detector type which advantageously incorporates means for dynamically compensating for undesired effects of de-emphasis of such switching-associated transients.

In accordance with an illustrative embodiment of the present invention, recurring pulses, having edges substantially coinciding with the instants of switching of said center frequency tuning, are processed in such manner that a differentiated version of said pulses is delivered to the output terminal of the de-emphasis circuit with a sense and magnitude appropriate to compensation for the above-described undesired effects on the image of de-emphasis of the switching-associated transients. In a desirable approach to the requisite pulse processing, pursuant to a further aspect of the present invention, the differentiation is effected by circuit elements also serving to perform the de-emphasis function.

In the accompanying drawing:

FIG. 1 illustrates, partially schematically and partially by block diagram representation, receiver apparatus for processing a SECAM-encoded color television signal including a de-emphasis system dynamically compensated in accordance with an embodiment of the present invention; and FIG. 2 illustrates elements for effecting a modification of the FIG. 1 apparatus in accordance with a further embodiment of the present invention.

In the receiver apparatus of FIG. 1, a composite video input signal (derived from the receiver's video detector, not illustrated) appears at input terminal I, and is supplied to a bandpass filter 11, as well as to the receiver's luminance channel (not illustrated). Bandpass filter 11 has a passband which encompasses the chrominance signal band of a SECAM transmission, and is provided with a frequency response characteristic of a "cloche" or bell-shaped form, appropriately complementary to the characteristic employed for pre-emphasis of subcarrier sidebands in SECAM signal formation.

The output of bandpass filter 11 is supplied to a limiter 13. The limited signals developed by limiter 13 are supplied to an FM detector 15, illustratively of the quadrature detector type, such as described, for example, in the aforementioned U.S. Pat. No. 4,232,268. An output of the FM detector 15 is coupled to the input of a lowpass filter 17 having a passband appropriate for modulating signal recovery and subcarrier rejection.

Control of the effective center frequency of the frequency discrimination characteristic of FM detector 15 is effected by circuitry coupled to detector terminal P, which will be described in detail subsequently. The tuning control, when operating correctly during reception of SECAM signals, is such that the output of lowpass filter 17 comprises, during the image portions of successive active line intervals, recovered R-Y and B-Y color-difference signals in sequence. The color-difference signals passed by filter 17 are delivered to an output terminal O via a de-emphasis network 19, provided with a characteristic complementary to the modulating signal pre-emphasis characteristic employed in SECAM signal formation.

An output of FM detector 15 is supplied to the signal inputs of a pair of sample-and-hold circuits 22 and 24. Operation of sample-and-hold circuit 22 is subject to control by (a) a half line rate square wave output of a flip-flop 20, appearing at terminal FF, and (b) line rate pulses (of lead-in burst interval timing) developed by a burst gating pulse source 29, in such manner that sample-and-hold circuit 22 effects sampling of the detector output during the lead-in burst occurrences of alternate active line intervals. Operation of sample-and-hold circuit 24 is subject to control by (a) a half line rate square wave output of flip-flop 20, appearing at terminal $\overline{FF}$ (and complementary in phase to the output at terminal FF), and (b) the line rate pulses developed by burst gating pulse source 29, in such manner that sample-and-hold circuit 24 effects sampling of the detector output during the lead-in burst occurrences of the intervening active line intervals.

Flip-flop 20 is subject to triggering by line rate pulses, illustratively positive-going and timed to encompass the horizontal blanking intervals of the SECAM signal, and developed by a horizontal blanking pulse source 21 at its output terminal HB. The outputs of the respective sample-and-hold circuits 22 and 24 are supplied to a voltage comparator 26. A level detector 28, responsive to an output of comparator 26, effects disabling or enabling of the flip-flop 20.

The tuning control circuitry coupled to terminal P of FM detector 15 includes a tank circuit formed by a capacitor 55 and an adjustable inductor 51 connected in parallel, and shunted by a resistor 53. A capacitor 57 is coupled between one end of the tank circuit and detector terminal P, and the other end of the tank circuit is connected to a point of reference potential (e.g., ground).

The emitter-collector path of a grounded-emitter NPN transistor 40, when conducting, serves to couple the parallel combination of a resistor 42 and a variable capacitor 41 in shunt with the tank circuit. A resistor 39 shunts the base-emitter path of transistor 40, and the base electrode of transistor 40 is directly connected to a tuning control signal input terminal CT.

Circuitry for development of the tuning control signal includes a pair of NPN transistors 31, 33 disposed with their emitter electrodes interconnected (at terminal J) and returned to ground via the collector-emitter path of a current source transistor (NPN transistor 35). The base electrode of transistor 31 is coupled to receive half line rate square waves from terminal FF of flip-flop 20, while the base electrode of transistor 33 is coupled to receive the positive-going horizontal blanking pulses from terminal HB of blanking pulse source 21. The base electrode of current source transistor 35 is coupled to receive a suitable positive bias potential.

The collector electrode of transistor 31 is directly connected to the base electrode of a multiple-collector PNP transistor 36. The emitter electrode of transistor 36 is directly connected to the positive terminal (+12 V.) of an operating potential supply. One collector electrode (38) of transistor 36 is directly connected to the base electrode of transistor 36, while another collector electrode (37) of transistor 36 is directly connected to terminal CT.

De-emphasis network 19 includes a resistor 61 connected between the output of filter 17 and output terminal O, and the series combination of capacitor 63, resistor 65, and resistor 67, connected in the order named between output terminal O and the +12 V. terminal of the operating potential supply. The collector electrode of transistor 33 is directly connected to the junction (D) of resistors 65 and 67.

In operation of the above-described circuitry, transistor 31 is cut off during each line interval which coincides with development of the negative half-cycle of the half line rate square wave at terminal FF. During the intervening line intervals which coincide with development of a positive half cycle of the half line rate square wave at terminal FF, transistor 31 is permitted to conduct, except during that (horizontal blanking) portion thereof which coincides with appearance of a positive-going horizontal blanking pulse at the base of transistor 33. A portion of a replicated version of the collector current of transistor 31, developed by transistor 36 functioning as a current mirror, is supplied as base current to transistor 40. Thus, throughout alternate line intervals and during the horizontal blanking portion of the intervening line intervals, transistor 40 is cut off (decoupling network 41, 42 from the tank circuit 51, 55), and, during the remaining portion of each of said intervening line intervals, transistor 40 is rendered conducting (shunting network 41, 42 across the tank circuit 51, 55).

Illustratively, FM detector 15 is of the quadrature detector type described in the aforementioned U.S. Pat. No. 4,232,268 and comprises a signal multiplier supplied with two inputs, one input comprising the output of limiter 13 applied directly to the multiplier and the other input comprising the limiter output applied via frequency sensitive phase shifter incorporating the circuitry coupled to terminal P. Inductor 51 is illustratively adjusted to cause the tank circuit 51, 55 to exhibit parallel resonance at the R-Y subcarrier resting frequency (4.40625 MHz.) during periods when transistor 41 is not conducting. During such periods, the second input to the signal multiplier comprises signals subject to the action of a phase shifter which imparts a 90° phase shift for a signal frequency substantially equal to the R-Y subcarrier resting frequency. Capacitor 41 is illustratively adjusted to cause the tank circuit, as modified by the additionally paralleled capacitance, to exhibit parallel resonance at the B-Y subcarrier resting frequency (4.250 MHz.) when transistor 40 is conducting. During the periods when transistor 40 is rendered conducting, the second input to the signal multiplier comprises signals subject to the action of a phase shifter which imparts a 90° phase shift for a signal frequency substantially equal to the B-Y subcarrier resting frequency.

It will be appreciated that, due to the effect of the horizontal blanking pulses in assuring cut-off of transistors 31, 36 and 40 during the horizontal blanking portions of all line intervals, the center frequency tuning for detector 15 will be the same (at the R-Y subcarrier resting frequency) for all lead-in bursts, and independent of the phasing of the outputs of flip-flop 20. If the flip-flop phasing is correct, transistor 40 will be cut off during the image portion of each line interval conveying R-Y color-difference signal information, and transistor 40 will be conducting during the image portion of each line interval conveying B-Y color-difference signal information, and the desired color-difference signals will appear in sequence at the output of low pass filter 17. However, if the flip-flop phasing is incorrect, transistor 40 will be cut off during the image portions of B-Y line intervals, and conducting during the image portions of R-Y line intervals, and proper color-difference signal recovery will not occur.

The identification system formed by elements 22, 24, 26, 28 of the FIG. 1 apparatus functions to detect and correct such incidents of incorrect flip-flop phasing, as explained in detail in the aforementioned U.S. Pat. No. 4,240,102. Illustratively, sampling of an output of detector 15 is effected in sample-and-hold circuit 22 when a burst gating pulse from source 29 coincides with appearance of a positive half cycle of the half line rate square wave at terminal FF, whereas sampling of the detector output is effected in sample-and-hold circuit 24 when a burst gating pulse coincides with appearance of a positive half cycle of the half line rate square wave at the complementary flip-flop terminal $\overline{FF}$. Comparison of the outputs of the respective sample-and-hold circuits takes place in voltage comparator 26. When the phasing of the flip-flop 20 is incorrect, the comparator output will be such as to cause level detector 28 to provide an output effecting shut-down of flip-flop 20. During flip-flop shut-down, the difference between the outputs of the respective sample-and-hold circuits will lessen, and the level detector output will alter to re-enable the flip-flop. If the flip-flop phasing is now correct, the comparator output will be such as to continue the flip-flop's enabled condition; if incorrect, a new cycle of shut-down and re-start will commence, and such cycles will continue until correct phasing is attained.

When the flip-flop 20 is operating with correct phasing, the output of low pass filter 17 comprises, during the image portions of successive active line intervals, desired R-Y and B-Y color-difference signals in appropriate sequence, but with the rapid signal transitions thereof in pre-emphasized form. Also included in the output, at the end of the horizontal blanking portion of alternate active line intervals (conveying B-Y signal information), is a rapid signal transition component (not in pre-emphasized form) caused by the switching of the detector's center frequency tuning (from R-Y subcarrier resting frequency to B-Y subcarrier resting frequency). Due to the high frequency roll-off of the frequency response characteristic of the de-emphasis circuit 19 to which the output of low pass filter 17 is applied, the (desired) signal transitions of the respective color-difference signals appear in their original form at output terminal O, freed of the effects of pre-emphasis. The effect of the de-emphasis network on the aforementioned switching transient, however, is to stretch out the transition, extending it over an initial segment of the image portion of the B-Y line interval.

Illustratively, the poling of the detector output which is supplied to low pass filter 17 is such as to develop a negative pulse when each B-Y lead-in burst is demodulated (with center frequency tuning for detector 15 at the R-Y subcarrier resting frequency). The transistion at the end of the horizontal blanking interval, due to center frequency tuning switching to the B-Y subcarrier resting frequency, is thus a positive-going one, which is subject to stretching by de-emphasis network 19. Compensation for this stretching of a positive-going transition is provided in the FIG. 1 arrangement by the delivery to output terminal O of a differentiated version of recurring pulses developed at the collector electrode of transistor 33, as explained below.

As previously described, positive-going horizontal blanking pulses from terminal HB are supplied to the base electrode of transistor 33, while half line rate square waves from terminal FF are supplied to the base electrode of transistor 31. Illustratively, the relative levels associated with the respective waveforms supplied to these bases are as follows: (a) the horizontal blanking waveform at terminal HB is at a +2.8 volt level during horizontal blanking pulse appearances, and at a +1.4 volt level during the inter-pulse intervals; (b) the square wave output at terminal FF is at a +2.1 volt level during each positive half-cycle and at a 0 volt level during each negative half-cycle. With such relationships between the waveforms at the respective bases, conduction by transistor 33 (when flip-flop 20 has attained correct phasing) commences with the beginning of the horizontal blanking portion of an R-Y line interval, continues throughout the entire R-Y line interval and on into the horizontal blanking portion of the succeeding B-Y line interval, and terminates at the beginning of the image portion of the B-Y line interval.

There is thus developed at the collector electrode of transistor 33 a train of negative pulses which have leading edges coinciding with the R-Y line interval beginnings (when center frequency tuning switches to the R-Y subcarrier resting frequency) and trailing edges coinciding with the B-Y line interval image portion beginnings (when center frequency tuning switches to the B-Y subcarrier resting frequency). These negative pulses appear at terminal D of the de-emphasis network 19, and a differentiated version thereof is delivered to output terminal O (with de-emphasis circuit elements 63, 61 cooperating to provide such differentiating action).

The differentiated version of the (positive-going) trailing edge of the negative pulse developed by transistor 33 combines at terminal O with the de-emphasized positive-going switching transient component in a manner substantially eliminating the undesired stretch-out and its adverse effect on the coloring of the left side of the image. By suitable control of the amplitude of the pulses developed at terminal D (via appropriate choice of the resistance value of resistor 67, and of the value of the current supplied by source transistor 35), optimization of the compensation can be realized. The chosen resistance value for resistor 67 should, however, be compatible with maintenance of an appropriate relationship between the resistance value of resistor 61 and the sum of the resistance values of resistors 65 and 67. For a proper SECAM de-emphasis characteristic, the latter relationship is desirably such that the resistance value of resistor 61 is substantially equal to twice the sum of the resistance values of resistors 65 and 67.

In my copending patent application, Ser. No. 257,167, filed on Apr. 24, 1981, now U.S. Pat. No. 4,357,263, a dual-mode identification system is disclosed. In one (horizontal) mode of operation, identification information is derived (as in the system described hereinbefore) from the lead-in bursts preceding image signals during active line intervals. In the other (vertical) mode of operation, identification information is derived from identification oscillations present during selected line periods within the vertical blanking interval. The present invention may be advantageously used with such a dual-mode identification system, and when so used the circuitry associated with terminal J of FIG. 1 is appropriately modified by the addition of the elements of FIG. 2.

As shown in FIG. 2, the modification involves use of an additional NPN transistor 61 disposed as an emitter-follower, with its emitter electrode directly connected to terminal J, its collector electrode directly connected to the +12 V. supply terminal, and its base electrode connected to the output terminal (V) of a mode gated vertical blanking pulse source 60. Source 60 delivers positive-going vertical blanking pulses to terminal V only when the vertical identification mode is selected. The vertical blanking pulses turn transistor 61 on and drive transistors 31, and 33 off, thus maintaining center frequency tuning at the R-Y subcarrier resting frequency (and barring pulse creation at terminal D) throughout each vertical blanking period. During active line intervals, however, transistor 61 is cut off, and dynamic de-emphasis compensation occurs in the manner described above in explanation of the operation of FIG. 1. When the horizontal identification mode is selected, the level at terminal V is held such that transistor 61 is continually cut off, and the operation of the FIG. 1 circuit proceeds without disturbance in the manner previously described.

What is claimed is:

1. In a color television receiver subject to reception of composite color television signals having periodic vertical blanking intervals interposed between successive sequences of active line intervals, and inclusive of a chrominance component encoded in SECAM format; said SECAM-encoded chrominance component comprising: (a) during image portions of alternate active line intervals, a first subcarrier having a first resting frequency and subject to frequency modulation over a given frequency deviation range in accordance with a first pre-emphasized color-difference signal; and (b) during image portions of the intervening active line intervals, a second subcarrier having a second resting frequency and subject to frequency modulation over said given frequency deviation range in accordance with a second pre-emphasized color-difference signal; with a lead-in burse of oscillations at said first resting frequency preceding the image portion of each of said alternate active line intervals, and with a lead-in burst of oscillations at said second resting frequency preceding the image portion of each of said intervening active line intervals, apparatus comprising:

an FM detector, responsive to the received signals, and subject to operation in either a first mode with center frequency tuning corresponding to the resting frequency of said first subcarrier, or a second mode with center frequency tuning corresponding to the resting frequency of said second subcarrier;

a triggered flip-flop circuit for providing a half line rate wave output;

a source of line rate pulses timed to encompass the periods of appearance of said lead-in bursts to the exclusion of the periods of appearance of said modulated subcarriers;

means, responsive to said line rate pulses, and to said half line rate wave output, for controlling the operating mode of said FM detector such that said FM detector operates in respectively different ones of said modes during the image portions of successive active line intervals but operates in only said first mode during the periods of appearance of said lead-in bursts;

identification means, responsive to an output of said FM detector, and responsive to said half line rate wave output, for controlling the phasing of said half line rate wave output;

de-emphasis means, having an input terminal and an output terminal, said input terminal being coupled to receive a demodulated signal output of said FM detector, for subjecting said demodulated signal output to a frequency response characteristic exhibiting a response decline with increase in signal frequency over at least a portion of the frequency range occupied by said color-difference signals;

means, responsive to line rate pulses from said source, and to said half line rate wave output, for delivering to said output terminal a differentiated version of recurring pulses which have leading and trailing edges timed to coincide with the changes of operating mode of said FM detector.

2. Apparatus in accordance with claim 1 wherein said de-emphasis means includes a resistor; a capacitor; means for coupling said resistor between said input terminal and said output terminal; and means for coupling said capacitor between said output terminal and a point of substantially fixed potential; and wherein said delivering means utilizes said capacitor and said resistor to effect differentiation of said recurring pulses.

3. Apparatus in accordance with claim 2 wherein said capacitor coupling means includes resistive means interposed between said capacitor and said point of substantially fixed potential, said resistive means having an intermediate terminal; wherein said demodulated signal output of said FM detector includes pulses of a first polarity developed in response to the appearances of said lead-in bursts of said second resting frequency; wherein the trailing edges of said recurring pulses substantially coincide with the trailing edges of the pulses developed in said detector output; and wherein said delivering means includes means for supplying said recurring pulses to said intermediate terminal with a polarity equal to said first polarity.

4. Apparatus in accordance with claim 3 wherein said FM detector includes a tank circuit exhibiting resonance at one of said first and second resting frequencies; wherein said pulse supplying means includes a first transistor having base, emitter and collector electrodes; a current source interposed between said emitter electrode and a point of reference potential different from said substantially fixed potential; means for coupling line rate pulses from said source to said base electrode; a second transistor having base, emitter and collector electrodes; means for coupling said emitter electrode of said second transistor to said emitter electrode of said first transistor; means for coupling said half line rate wave output to said base electrode of said second transistor; and means for coupling said collector electrode to said intermediate terminal;

wherein said detector mode controlling means includes a reactance; switching means, having first and second switching states, for coupling said reactance in parallel with said tank circuit when in said first switching state, and decoupling said reactance from said tank circuit when in said second switching state; and means for rendering the switching state of said switching means responsive to the collector current of said second transistor; and wherein the parallel combination of said tank circuit and said reactance exhibits resonance at the other of said first and second resting frequencies.

5. Apparatus in accordance with claim 4 wherein said identification means includes:

first sampling means, coupled to receive an output of said FM detector, and responsive to a half line rate wave output of said flip-flop circuit, for sampling the output of said FM detector only during alternate ones of said periods of appearance of lead-in bursts;

second sampling means, coupled to receive an output of said FM detector, and responsive to a half line rate wave output of said flip-flop circuit opposite in phase to the half line rate wave output to which said first sampling means is responsive, for sampling the output of said FM detector only during the intervening ones of said periods of appearance of said lead-in bursts;

means for comparing the output levels of said first and second sampling means; and means, responsive to an output of said comparing means, for altering the operation of said flip-flop circuit only when the output level of a given one of said sampling means significantly exceeds the output level of the other of said sampling means.

6. Apparatus in accordance with claim 4 wherein the magnitude of resistance exhibited by said resistor is substantially twice the magnitude of resistance exhibited by said resistive means.

* * * * *